(12) United States Patent
Ng

(10) Patent No.: US 6,456,935 B1
(45) Date of Patent: Sep. 24, 2002

(54) VOICE GUIDANCE INTONATION IN A VEHICLE NAVIGATION SYSTEM

(75) Inventor: Yik-Mien Ng, Santa Clara, CA (US)

(73) Assignee: Horizon Navigation, Inc., Santa Clara, CA (US)

( * ) Notice: Subject to any disclaimer, the term of this patent is extended or adjusted under 35 U.S.C. 154(b) by 0 days.

(21) Appl. No.: 09/537,005

(22) Filed: Mar. 28, 2000

(51) Int. Cl.⁷ .......................... G01C 21/00; G06F 15/00
(52) U.S. Cl. ..................................... 701/211; 704/200
(58) Field of Search .............................. 701/1, 23–26, 701/200–202, 208–211; 340/988, 995, 996; 704/9, 200, 205–207, 258, 270, 270.1, 271

(56) References Cited

U.S. PATENT DOCUMENTS

| | | |
|---|---|---|
| 3,845,289 A | 10/1974 | French |
| 4,342,023 A | 7/1982 | Tsunoda et al. |
| 4,359,713 A | 11/1982 | Tsunoda |
| 4,570,227 A | 2/1986 | Tachi et al. |
| 4,608,656 A | 8/1986 | Tanaka et al. |
| 4,611,293 A | 9/1986 | Hatch et al. |
| 4,672,565 A | 6/1987 | Kuno et al. |
| 4,673,878 A | 6/1987 | Tsushima et al. |
| 4,723,218 A | 2/1988 | Hasebe et al. |
| 4,734,863 A | 3/1988 | Honey et al. |
| 4,751,512 A | 6/1988 | Longaker |
| 4,774,672 A | 9/1988 | Tsunoda et al. |
| 4,782,447 A | 11/1988 | Ueno et al. |
| 4,796,191 A | 1/1989 | Honey et al. |
| 4,797,841 A | 1/1989 | Hatch |
| 4,829,565 A | 5/1989 | Goldberg |
| 4,831,563 A | 5/1989 | Ando et al. |
| 4,862,398 A | 8/1989 | Shimizu et al. |
| 4,882,696 A | 11/1989 | Nimura et al. |
| 4,914,605 A | 4/1990 | Loughmiller, Jr. et al. |
| 4,918,609 A | 4/1990 | Yamawaki |
| 4,926,336 A | 5/1990 | Yamada |
| 4,937,753 A | 6/1990 | Yamada |
| 4,964,052 A | 10/1990 | Ohe |
| 4,970,652 A | 11/1990 | Nagashima |
| 4,982,332 A | 1/1991 | Saito et al. |
| 4,984,168 A | 1/1991 | Neukrichner et al. |
| 4,989,151 A | 1/1991 | Nuimura |
| 4,992,947 A | 2/1991 | Nimura et al. |
| 4,996,645 A | 2/1991 | Schneyderberg Van DerZon |
| 4,999,783 A | 3/1991 | Tenmoku et al. |
| 5,040,122 A | 8/1991 | Neukirchner et al. |
| 5,046,011 A | 9/1991 | Kakihara et al. |

(List continued on next page.)

FOREIGN PATENT DOCUMENTS

| | | |
|---|---|---|
| EP | 0 485 120 A2 | 5/1992 |
| EP | 0 575 943 A1 | 12/1993 |
| GB | 2 271 423 A | 4/1994 |

OTHER PUBLICATIONS

French, *MAP matching Origins Approaches and Applications*, Rober L. French & Associates, 3815 Lisbon St., Suite 201, Fort Worth, Texas 76107, USA, pp. 91–116.

*Primary Examiner*—William A. Cuchlinski, Jr.
*Assistant Examiner*—Thu Nguyen
(74) *Attorney, Agent, or Firm*—Beyer Weaver & Thomas, LLP

(57) ABSTRACT

A method and apparatus are described for providing route guidance to a user of a vehicle navigation system. A route is generated which corresponds to a plurality of maneuvers. Each of the maneuvers includes a plurality of voice fragments. Each of the voice fragments may have more than one associated audio file. Multiple audio files for the same voice fragment contain different audio output for the voice fragment. A maneuver instruction corresponding to a particular maneuver is generated by selecting audio files for each of the voice fragments in the maneuver. By providing multiple audio files for the same voice fragment and flexible selection of the multiple audio files for a maneuver instruction, route guidance communication may be improved.

35 Claims, 4 Drawing Sheets

U.S. PATENT DOCUMENTS

| | | | |
|---|---|---|---|
| 5,060,162 | A | 10/1991 | Ueyama et al. |
| 5,177,685 | A  * | 1/1993 | Davis et al. ............... 455/456 |
| 5,184,123 | A | 2/1993 | Bremer et al. |
| 5,220,507 | A | 6/1993 | Kirson |
| 5,272,638 | A | 12/1993 | Martin et al. |
| 5,278,424 | A | 1/1994 | Kagawa |
| 5,283,743 | A | 2/1994 | Odagawa |
| 5,285,391 | A | 2/1994 | Smith, Jr. et al. |
| 5,287,297 | A | 2/1994 | Ihara et al. |
| 5,296,855 | A | 3/1994 | Matsuzaki et al. |
| 5,297,050 | A | 3/1994 | Ichimura et al. |
| 5,315,298 | A | 5/1994 | Morita |
| 5,359,529 | A | 10/1994 | Snider |
| 5,369,588 | A | 11/1994 | Hayami et al. |
| 5,371,497 | A | 12/1994 | Nimura et al. |
| 5,394,332 | A | 2/1995 | Kuwahara et al. |
| 5,404,307 | A | 4/1995 | Odagawa |
| 5,406,492 | A | 4/1995 | Suzuki |
| 5,410,485 | A | 4/1995 | Ichikawa |
| 5,410,486 | A | 4/1995 | Kishi et al. |
| 5,412,573 | A | 5/1995 | Barnea et al. |
| 5,422,815 | A | 6/1995 | Hijikata |
| 5,444,629 | A | 8/1995 | Kishi et al. |
| 5,463,554 | A | 10/1995 | Araki et al. |
| 5,469,158 | A | 11/1995 | Morita |
| 5,486,822 | A | 1/1996 | Tenmoku et al. |
| 5,506,774 | A | 4/1996 | Nobe et al. |
| 5,508,930 | A | 4/1996 | Smith, Jr. |
| 5,513,110 | A | 4/1996 | Fujita et al. |
| 5,519,619 | A | 5/1996 | Seda |
| 5,521,826 | A | 5/1996 | Matsumoto |
| 5,644,082 | A | 7/1997 | Iwata et al. |
| 5,657,231 | A | 8/1997 | Nobe et al. |
| 5,684,704 | A | 11/1997 | Okazaki |
| 5,689,252 | A | 11/1997 | Ayanoglu et al. |
| 5,699,256 | A | 12/1997 | Shibuya et al. |
| 5,712,788 | A | 1/1998 | Liaw et al. |
| 5,729,109 | A | 3/1998 | Kaneko et al. |
| 5,737,225 | A | 4/1998 | Schulte |
| 5,742,925 | A | 4/1998 | Baba |
| 5,774,071 | A | 6/1998 | Konishi et al. |
| 5,790,973 | A | 8/1998 | Blaker et al. |
| 5,878,393 | A  * | 3/1999 | Hata et al. ............... 704/260 |
| 5,900,825 | A | 5/1999 | Pressel et al. |
| 5,904,728 | A | 5/1999 | Tamai et al. |
| 5,935,193 | A | 8/1999 | Saiki |
| 5,938,720 | A | 8/1999 | Tamai |

* cited by examiner

VOICE GUIDANCE INTONATION IN A VEHICLE NAVIGATION SYSTEM

BACKGROUND OF THE INVENTION

The present invention relates to the manner in which a vehicle navigation system communicates a calculated route to a driver. More specifically, the present invention relates to the selection of audio files used to construct maneuver instructions which alert the driver to upcoming maneuvers.

Vehicle navigation systems employ a variety of methods for communicating a route to a driver. One conventional method employs voice prompts or maneuver instructions to inform the driver of an upcoming maneuver. By using maneuver instructions, the system allows the driver to keep his eyes on the road.

Currently available vehicle navigation systems construct maneuver instructions from previously stored voice fragments. By way of example, the fragments may include numbers and directions, e.g. one, north, south, etc. Current vehicle navigation systems typically store a single audio file for a voice fragment. Thus, once a maneuver is determined, the same voice fragment is used by the system to present a voice fragment within a maneuver instruction regardless of the upcoming maneuver.

Unfortunately, as voice intonation often changes in natural speech based on content, this static method often does not present a natural sounding instruction.

It is, therefore, desirable that techniques be developed by which more natural sounding maneuver instructions are generated.

SUMMARY OF THE INVENTION

The present invention is directed to systems and methods for generating maneuver instructions and presenting them to the user of a vehicle navigation system. The maneuver instructions are generated from voice fragments whose audio files may be flexibly selected to improve presentation of routing information provided by the vehicle navigation system.

According to one embodiment, the system may maintain multiple audio files for a fragment used to construct maneuver instructions wherein the multiple audio files for the same fragment each present a different voice intonation. After receiving a maneuver instruction, the system selects a particular audio file for each fragment in the maneuver instruction. In some embodiments, an audio file is selected for a fragment based on the presence of other fragments included in a maneuver instruction. By providing this flexible selection of audio files for voice fragments, voice guidance of the present invention more closely resembles natural human speech.

According to a specific embodiment, once a route has been calculated and maneuvers have been determined, the system selects audio files for each fragment of a maneuver instruction in a manner determined in part by one or more fragments of the maneuver instruction. According to some embodiments, the present invention determines whether the last fragment in a maneuver instruction is a descriptor. The system then selects an audio file for a fragment preceding the descriptor based on the presence of the descriptor. In a specific embodiment wherein a descriptor is included, audio files are selected such that the voice intonation of the descriptor decreases in frequency, i.e., ends with a "down" emphasis, while the fragment preceding the descriptor increases in frequency, i.e., ends with an "up" emphasis.

According to a specific embodiment, the present invention improves voice guidance by determining whether a number included in a maneuver instruction is presented alone or is concatenated with another number. The system then selects an appropriate audio file or files for numeric fragments in the maneuver instruction based on this determination. The audio files to be selected from may vary in voice intonation.

Thus, according to the invention, a method and apparatus are provided for providing route guidance to a user of a vehicle navigation system. A route is generated which corresponds to a plurality of maneuvers. The maneuver instruction corresponding to each maneuver is generated. Generating the maneuver instruction includes selecting an audio file for each fragment of the maneuver instruction. Selection of an audio file for a voice fragment may include flexible selection between multiple audio files for the same fragment. In turn, the maneuver instructions are audibly presented to a user of the vehicle navigation system. The flexible selection improves presentation and may improve recognition of the maneuver instructions.

In one aspect, the method includes selecting an audio file corresponding to a first voice fragment included in the maneuver instruction based on a second voice fragment included in the maneuver instruction.

In another aspect, the invention relates to a method for generating a maneuver instruction in a vehicle navigation system. The method includes receiving a maneuver instruction which comprises a first sentence portion, a second sentence portion and a maneuver information portion. The portions each comprise one or more voice fragments. The method also includes selecting a first audio file corresponding to the first sentence portion. The method further includes determining if the last voice fragment includes a number. The method additionally includes selecting a second audio file for the second to last voice fragment based on whether the last voice fragment includes a number. The method also includes presenting the first and second audio files.

Thus, the present invention provides a vehicle navigation system which flexibly communicates maneuver instructions for upcoming maneuvers in a manner which flexibly selects audio files for voice fragments of the maneuver instructions. Advantageously, the present invention provides advanced presentation and communication of maneuver instructions to the user of a vehicle navigation system. By flexibly constructing the presentation of maneuver instructions to more closely resemble natural human speech, the driver may more easily recognize the content of maneuver instructions issued by the navigation system.

A further understanding of the nature and advantages of the present invention may be realized by reference to the remaining portions of the specification and the drawings.

DESCRIPTION OF THE PREFERRED EMBODIMENT

Figure 1:
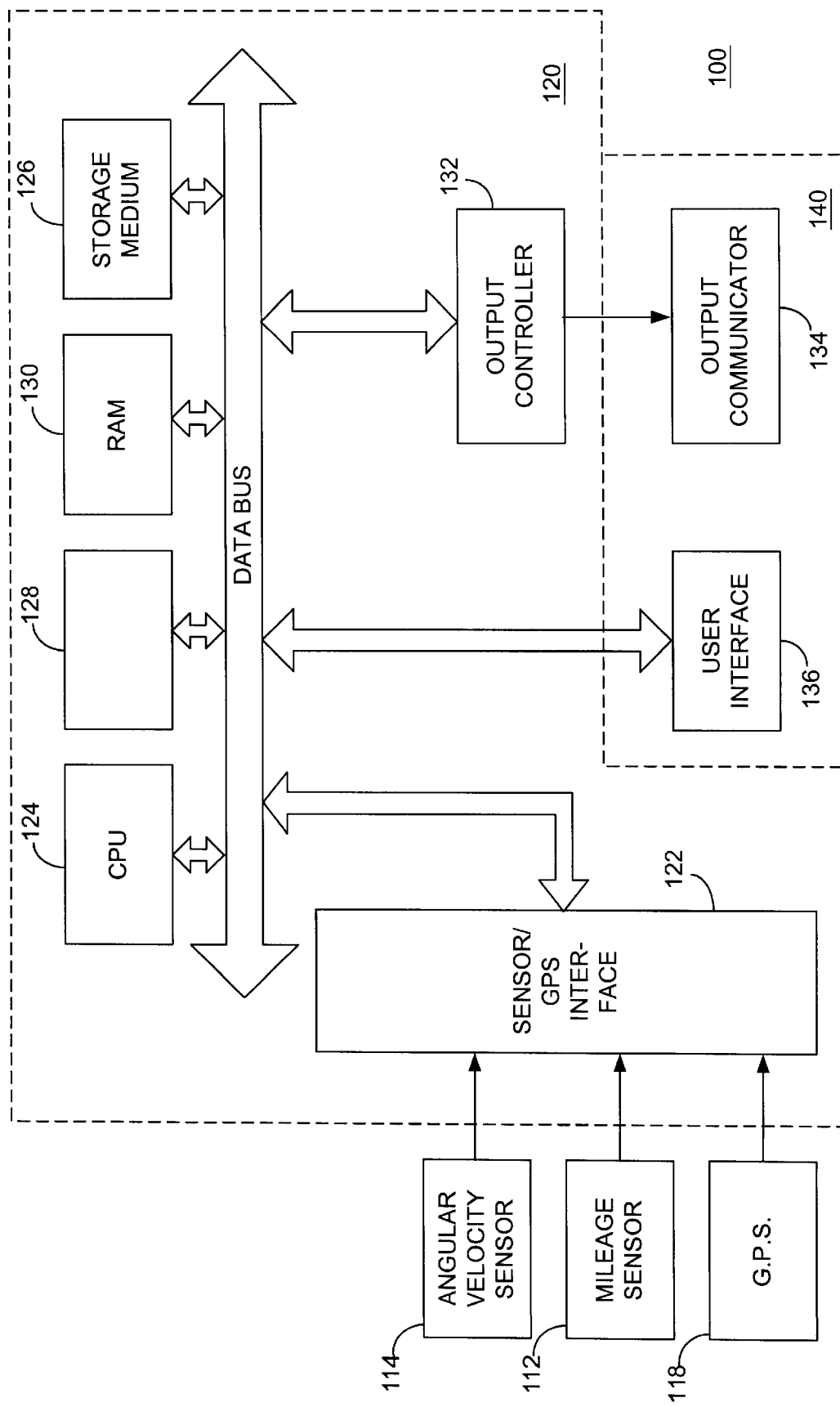
FIG. 1 is a block diagram of a vehicle navigation system for use with the present invention.

FIG. 1 is a block diagram of a specific embodiment of a vehicle navigation system 100 for use with the present invention. Sensors 112 and 114 and GPS receiver 118 are coupled to computing means 120 through sensor/GPS interface 122. In typical embodiments, mileage sensor 112 comprises an odometer, and angular velocity sensor 114 comprises a gyroscope, or a differential odometer coupled to the wheels of the vehicle. A global positioning system (GPS) data receiver 118 is provided for receiving signals from, for example, a satellite-based navigation system. Data from sensor/GPS interface 122 is transmitted to CPU 124, which performs calibration, signal processing, dead-reckoning, vehicle positioning, and route guidance functions.

A database containing map information is stored in database medium 126, with software directing the operation of computing means 120 stored in main memory 128 for execution by CPU 124. Memory 128 may comprise a wide variety of available memory types. System RAM 130 permits reading and writing of the information necessary to execute such software programs. Database medium 126 may comprise non-volatile memory, a hard disk drive, CD-ROM, or an integrated circuit in which digitized map information has been stored. Database medium 126 may also include a database of audio files corresponding to voice fragments used for generation of maneuver instructions. For reasons that will become clear, these audio files may include multiple audio files for the same voice fragment which differ in voice intonation.

Output controller 132, which may comprise a graphics controller and an audio controller, receives data processed by CPU 124 and transmits the data to display console 140 which includes output communicator 134, usually comprising a display screen with associated audio electronics and audio speakers. The driver may input data, such as a desired destination, through user interface 136, typically comprising a set of keys.

The map database stored in database medium 126 preferably comprises positional data such as, for example, latitude and longitude coordinates, to describe road intersections or nodes, road segments, landmarks and points of interest, and other geographical information. The database may further comprise data representing characteristics of roads or places on the map, such as road and place names, road features such as dividers, one-way restrictions, surface, speed limit, shape, elevation, and other properties. According to specific embodiments of the invention, the map database includes cost values associated with individual nodes and road segments. These cost values correspond to the estimates of time intervals for traversing the respective node or segment. Node cost values take into consideration such information as, for example, whether the vehicle would encounter oncoming traffic, thus delaying a left turn maneuver. Segment costs reflect road segment characteristics such as speed limit and segment length, both of which affect the travel time along the segment. Also associated with each road in the map database is a link class which relates to the category or type of the road. For example, the highest level category of the hierarchy is the link class FREEWAY. The lowest level includes the link classes FRONTAGE and MISC which include, for example, frontage roads and alleys.

Figure 2:
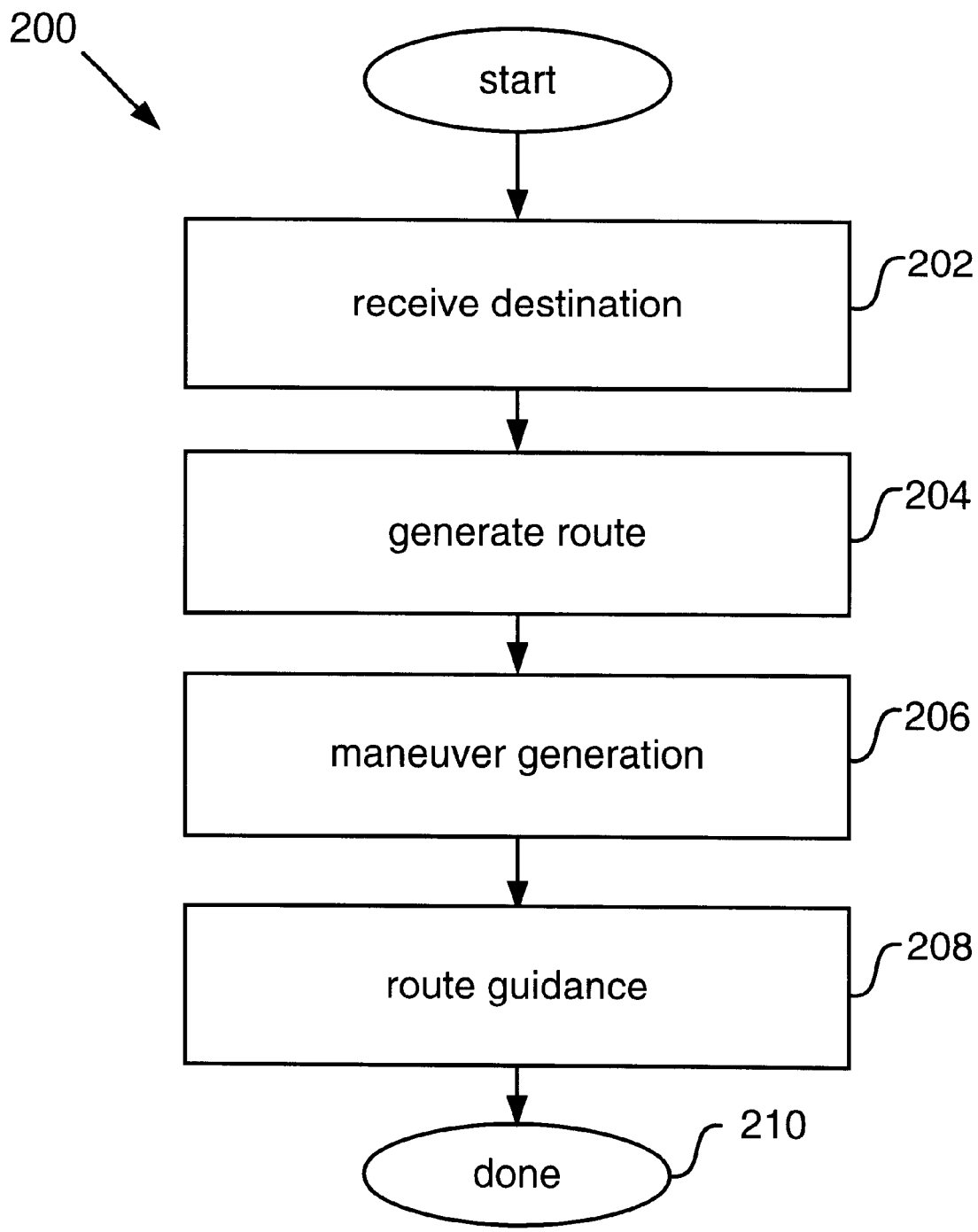
FIG. 2 is a flowchart which illustrates vehicle navigation using the vehicle navigation system of FIG. 1 in accordance with one embodiment of the present invention.

FIG. 2 is a flowchart 200 which illustrates vehicle navigation using the vehicle navigation system of FIG. 1 in accordance with one embodiment of the present invention.

Once a destination has been received (202), a route between a source location and the destination is generated (204). The vehicle navigation system of the present invention is operable to generate a route from a source location to a destination according to a variety of different methods. Some examples of such methods are described in commonly assigned, U.S. patent application Ser. No. 5,938,720 for ROUTE GENERATION IN A VEHICLE NAVIGATION SYSTEM, filed on Jan. 15, 1997, the entire specification of which is incorporated herein by reference.

The route comprises a plurality of contiguous road segments and a plurality of maneuvers to be executed by the driver. The system then generates a series of maneuvers corresponding to the route (206). As the driver traverses the route, the maneuver instructions corresponding to the maneuvers are sequentially communicated to the driver via a display console and audio speakers (208). Each maneuver instruction is communicated in advance of the location of the upcoming maneuver. Between maneuvers, the system determines at what point to communicate the next maneuver to the driver. Some examples of methods for determining this point are described in commonly assigned, U.S. patent application Ser. No. 5,904,728 for VOICE GUIDANCE TIMING IN A NAVIGATION SYSTEM, filed on Oct. 11, 1996, the entire specification of which is incorporated herein by reference. Each maneuver instruction and maneuver is completed in turn until the destination has been reached (210).

Figure 3:
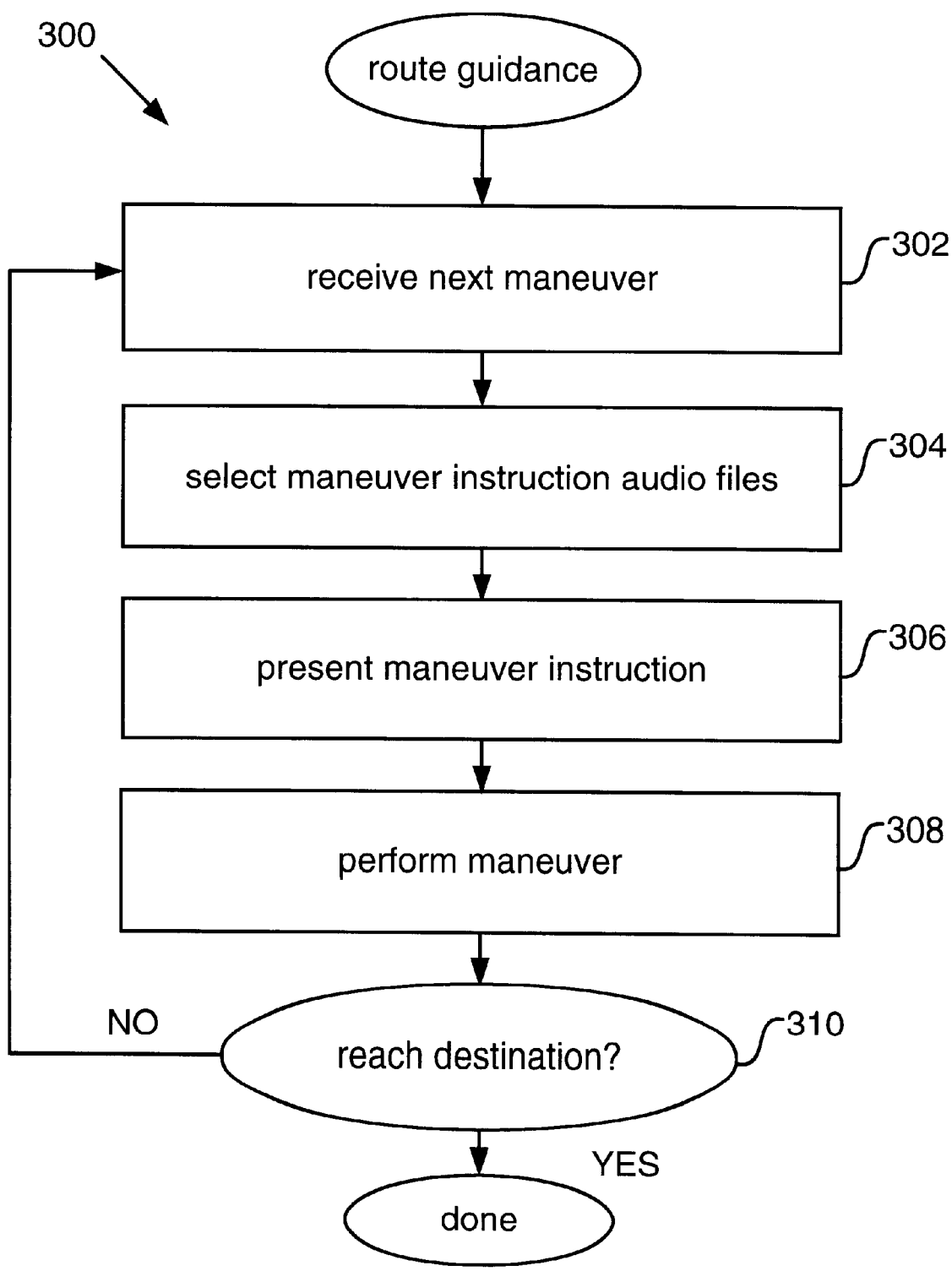
FIG. 3 is a flowchart which illustrates route guidance using the vehicle navigation system of FIG. 1 in accordance with another embodiment of the invention.

FIG. 3 is a flowchart 300 which illustrates route guidance (208 of FIG. 2) using the vehicle navigation system of FIG. 1 in accordance with another embodiment of the invention. As the driver proceeds along a route, the route guidance module receives each maneuver generated by the maneuver generation module as the vehicle approaches the location corresponding to the maneuver (302). The system then selects audio files for the voice fragments included in the maneuver (304). The maneuver instruction constructed from the audio files is then audibly presented to the driver (306). After the driver performs the intended maneuver (308), the system then checks if the destination has been reached. If the destination has not been reached, the process waits to receive the next maneuver (302).

Generally speaking, a maneuver instruction is provided to inform a vehicle navigation system user of an intended maneuver. A maneuver instruction may generally be referred to as a voice prompt, voice warning, or any other audio communication provided by the system to provide a user with maneuver information. The composition of a maneuver instruction may vary widely. In accordance with one embodiment of the present invention, a maneuver instruction may be divided into a first string and a maneuver string. The first string typically provides an action to be taken, e.g. "turn left" or "turn right". The maneuver string typically includes the geographic details of the maneuver, e.g. "U.S. Hwy 101 North". The maneuver string may contain road designations, numbers, geographic descriptors, etc.

A second string may optionally be included between the first string and the maneuver string and typically provides transition language to improve presentation of the voice warning, e.g. "on". The second string may also provide additional information included in the maneuver instruction, e.g. "from street to freeway on". The second string may not be included, for example, when two successive maneuvers are close to each other or must be executed in a short duration. Additional strings may optionally be included after the maneuver string. One example where an additional string is used is when two successive maneuvers are close to each other or must be executed in a short duration. In this case, the additional string may include further guidance information, e.g., "followed by a right turn".

The maneuver instruction and each of the strings may further be divided into one or more fragments. A fragment is an individual element of the maneuver instruction. The fragments may include words, syllables, phonemes or any other suitable constructs of language and auditory processing. By way of example, the maneuver string "U.S. Hwy. 101 North" may be divided into the voice fragments 'U', 'S', 'high', 'way', 'one', 'o', 'one' and 'north'. Thus, once a maneuver instruction has been determined, the maneuver instruction may be represented by a set of voice fragments.

The voice fragments are typically stored as audio files. The system maintains at least one audio file for each voice fragment. In the case where multiple audio files are maintained for the same voice fragment, the multiple audio files each contain a different audio output of the voice fragment. In other words, the system may maintain multiple audio files for the same voice fragment which sound substantially different when output to the user. In a specific embodiment of the present invention, the multiple audio files for a voice fragment are differentiated by voice intonation. Alternatively, the voice fragments may differ in intensity, frequency, bandwidth and/or duration. In a specific embodiment, two audio representations are maintained for a voice fragment. The first audio file has a downward voice intonation emphasis while the second audio file has an upward voice intonation emphasis.

The system selects which of the multiple audio files for a voice fragment are to be output for a particular maneuver instruction. According to various embodiments, a variety of criteria are employed for selecting an audio file for a particular voice fragment. In one embodiment, an audio file for a voice fragment is selected based on the presence of descriptor at the end of a maneuver instruction. The descriptor may correspond to, for example, a direction, route identifier, geographic construct or similar information. By way of example, the descriptor may include one of north, south, east, west, bridge, toll, alternate, loop, bypass, connector, extension, or combinations and abbreviations thereof.

As an illustrative example using the maneuver string "U.S. Hwy. 101 North", two audio files may be associated with the voice fragment "one". The first audio file has a downward voice intonation emphasis during audio output while the second audio file has an upward voice intonation emphasis. According to one embodiment, for the first instance of "one", the audio file with the downward voice intonation emphasis, is the default selection.

Under certain conditions, the audio file for the second instance of "one" is selected from the stored audio files in place of the default audio file. In a specific embodiment, the determining factor for which audio file is selected is whether a descriptor is present following the second voice fragment "one" in the maneuver string. In the present example, because the descriptor "North" is present, the audio file having the upward voice intonation emphasis is selected for the voice fragment "one". If, on the other hand, the descriptor "North" were not present, the audio file having the downward voice intonation emphasis would be selected.

As an additional example, "I-880" is a maneuver string in which a descriptor is not included. In this case, the maneuver string includes the voice fragments 'I', 'eight' and 'eighty'. The last voice fragment 'eighty' is not followed by a descriptor and thus an audio file having a downward voice intonation emphasis for the voice fragment 'eighty' is selected.

Other criteria may be used to select an audio file for a voice fragment. For example, where the voice fragment is a number, an audio file for the voice fragment is selected based on how the number is presented in the string. In a specific embodiment, the audio file is selected based on whether the number is "attached" or "unattached". An "unattached" number generally refers to a number in a numeric string which does not have at least one adjacent number in the string. In another specific embodiment, the attached number is the last numeric digit and is attached to the second last numeric digit. By way of example, 'five' for highway 'I-35' is attached because of the preceding 'three'. In contrast, for the maneuver string "U.S. Hwy 1 North", the voice fragment "one" is unattached.

In accordance with one embodiment of the present invention, an audio file having a downward voice intonation emphasis is selected for an unattached number. In a more specific embodiment, an audio file having an upward voice intonation emphasis is selected for all attached numeric voice fragments except the last numeric voice fragment. The audio file for the last numeric voice fragment is selected based on alternate criteria such as the presence of a subsequent descriptor as described above.

The present invention also includes selection of audio files for voice fragments based on multiple criteria. In some embodiments, the system may combine criteria in selecting an audio file for one or more fragments. In a specific embodiment, the selection may be based on the position of the voice fragment in the maneuver instruction as well as the content of the voice fragment. By way of example, the selection may be based both on whether the voice fragment is the second to last voice fragment in a maneuver instruction and whether the voice fragment is a number.

Alternatively, the selection may be based on whether a number is attached and whether a descriptor is provided after the number. In a specific embodiment, the system selects an audio file which has a downward voice intonation for an unattached number not followed by a descriptor. In another specific embodiment, when the number is unattached and is followed by a descriptor, the system selects an audio file which has an upward voice intonation for the unattached number. For an attached number, the system may select an audio file for the attached number based on whether the attached number is followed by a descriptor, as described above.

According to some embodiments, the system selects an audio file for multiple fragments within a maneuver instruction based on whether a suffix or final descriptor is present within the maneuver instruction. In a specific embodiment, the final descriptor is a direction while the preceding fragments are attached numeric fragments of a freeway or highway. In some embodiments, such as those including attached numbers not followed by a descriptor, the voice intonation of numeric fragments of the maneuver string all increase in frequency except the final numeric fragment, for which the frequency decreases. According to other embodiments, such as those including attached numbers followed by a descriptor, the voice intonations of numeric fragments in the maneuver string all increase in frequency.

Figure 4:
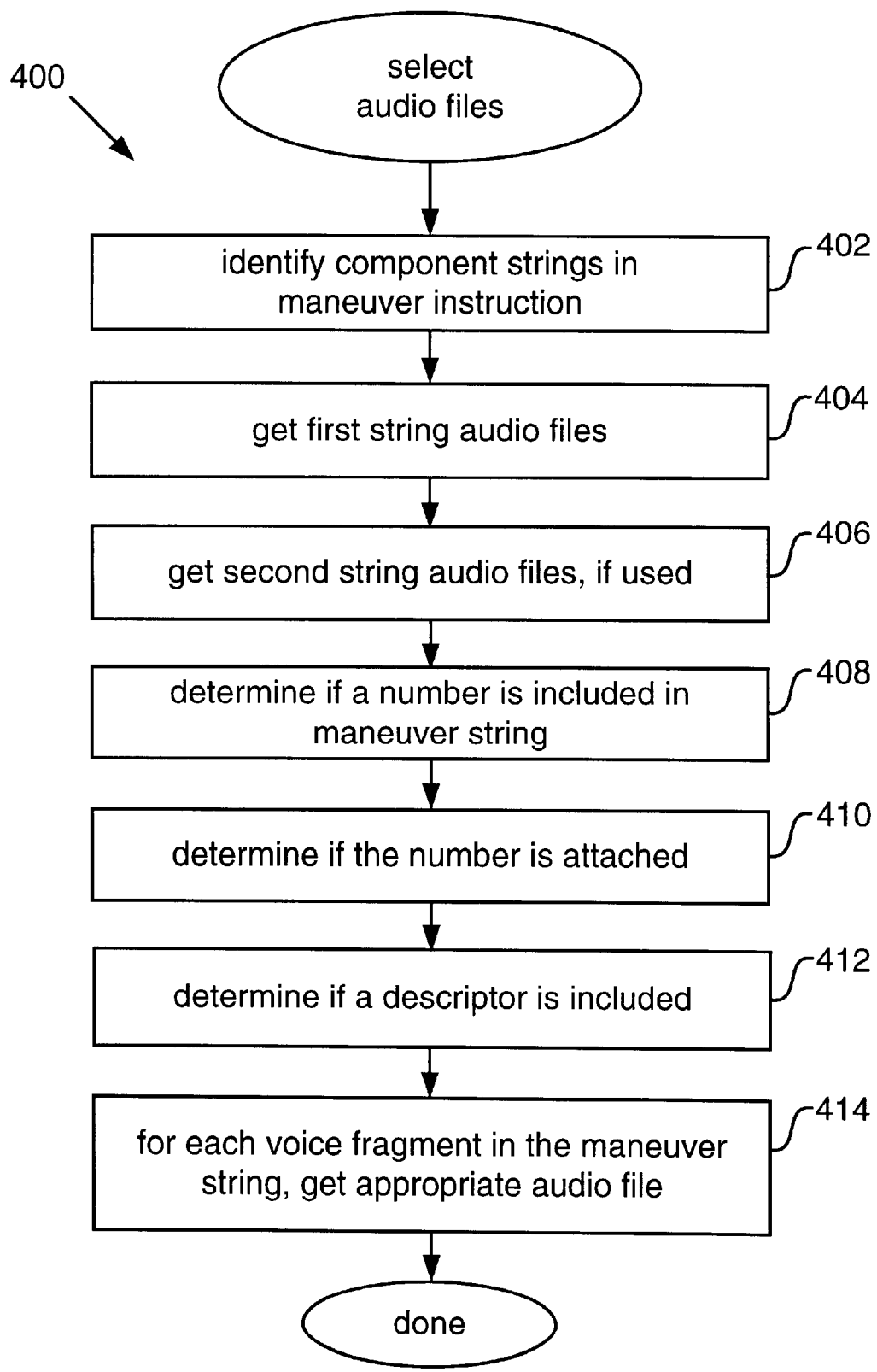
FIG. 4 is a flowchart which illustrates the generation of a maneuver instruction in accordance with a specific embodiment of the present invention.

FIG. 4 is a flowchart 400 which illustrates the selection of audio files (304 of FIG. 3) in accordance with a specific embodiment of the present invention. Once a maneuver has been received, the system identifies its component strings (402). One or more audio files for the first string are then selected and retrieved (404). If a second string is implemented between the first string and the maneuver string, one or more audio files are also selected and retrieved for the second fragment (406).

The system then proceeds to select an audio file for each fragment in the maneuver string. As discussed above, the selection criteria for audio files may vary widely. The selection process typically begins by analyzing the fragments of the maneuver string (408–412). For the specific process illustrated by flowchart 400, the audio files for the maneuver string are selected based on the numbers and descriptors included in a maneuver string. More specifically, the system determines if a number is provided in the maneuver string (408) and if so, whether the number is attached (410). The system also determines if a descriptor is included at the end of the maneuver string (412). The system then selects and retrieves an audio file for each of the fragments in the maneuver string based on these determinations (414).

According to some embodiments, the system selects audio files for fragments within a maneuver string with reference to the last fragment of the maneuver string, e.g. the descriptor. More specifically, the system may select an audio file for the second to last fragment based on the presence of the last fragment. In a specific embodiment, where the last fragment is a descriptor while the second to last fragment is the last numeric fragment of a freeway (e.g., 'North' and the second '1' in 101, respectively), the system selects an upward voice intonation for the second '1' voice fragment.

While the invention has been particularly shown and described with reference to specific embodiments thereof, it will be understood by those skilled in the art that the foregoing and other changes in the form and details may be made therein without departing from the spirit or scope of the invention. For example, the invention has been described primarily with regard to the selection and presentation of English voice guidance fragments and freeway formats. However, it will be understood that the present invention may easily be applied to the selection and presentation of voice guidance fragments and freeway formats in other languages. The scope of the invention should therefore be determined by reference to the appended claims.

What is claimed is:

1. A method for generating a maneuver instruction in a vehicle navigation system, the maneuver instruction comprising a plurality of voice fragments and corresponding to one of a plurality of maneuvers associated with a route generated by the vehicle navigation system, the method comprising selecting one of a plurality of audio files for each of the voice fragments thereby generating the maneuver instruction, a first one of the voice fragments comprising a number and having at least two audio files corresponding thereto, selection of one of the at least two audio files being done with reference to whether the plurality of voice fragments includes a descriptor second voice fragment, wherein the one of the at least two audio files which is selected has an upward voice intonation emphasis for the first one of the voice fragments.

2. The method of claim 1 wherein the first one of the voice fragments and the second voice fragment are consecutively presented.

3. The method of claim 1 wherein the first one of the voice fragments precedes the second voice fragment.

4. The method of claim 3 wherein the second voice fragment is the last voice fragment in the maneuver instruction.

5. The method of claim 4 wherein the first one of the voice fragments and the descriptor are consecutively presented.

6. The method of claim 5 wherein the descriptor is the last voice fragment in the maneuver instruction.

7. The method of claim 1 wherein the maneuver instruction comprises information relating to a freeway.

8. The method of claim 7 wherein the first one of the voice fragments comprises information relating to a freeway.

9. The method of claim 8 wherein the first one of the voice fragments comprises a number corresponding to the freeway.

10. The method of claim 1 wherein the second voice fragment comprises information relating to a freeway.

11. The method of claim 1 wherein the descriptor is one of north, south, east, west, toll, bridge and alternate.

12. The method of claim 1 wherein the maneuver instruction further comprises a first string relating to an action for the maneuver instruction.

13. The method of claim 12 wherein the maneuver instruction further comprises a second string after the first string and before the plurality of voice fragments.

14. The method of claim 13 wherein the second string comprises the word "on".

15. A method for generating a maneuver instruction in a vehicle navigation system, the maneuver instruction comprising a plurality of voice fragments and corresponding to one of a plurality of maneuvers associated with a route generated by the vehicle navigation system, the method comprising selecting one of a plurality of audio files for each of the voice fragments thereby generating the maneuver instruction, a first one of the voice fragments having at least two audio files corresponding thereto and comprising a number, selection of one of the at least two audio files being done with reference to whether the plurality of voice fragments includes an attached number, wherein the one of the at least two audio files which is selected has an upward voice intonation emphasis for the first one of the voice fragments.

16. The method of claim 15 wherein the first one of the voice fragments and the second voice fragment are consecutively presented.

17. The method of claim 15 wherein the first one of the voice fragments precedes the second voice fragment.

18. The method of claim 17 wherein the second voice fragment is the last voice fragment in the maneuver instruction.

19. The method of claim 15 wherein the maneuver instruction comprises information relating to a freeway.

20. The method of claim 19 wherein the first one of the voice fragments comprises information relating to a freeway.

21. A method for generating a maneuver instruction in a vehicle navigation system, the maneuver instruction comprising a plurality of voice fragments and corresponding to one of a plurality of maneuvers associated with a route generated by the vehicle navigation system, the method comprising selecting one of a plurality of audio files for each of the voice fragments thereby generating the maneuver instruction, the plurality of voice fragments comprising a first voice fragment having first and second audio files corresponding thereto, the first audio file having a first intonation characterized by an upward emphasis and the second audio file having a second intonation characterized by a downward emphasis, the first audio file being selected when the plurality of voice fragments comprises a descriptor voice fragment following the first voice fragment, the second audio file being selected when the plurality of voice fragments does not include the descriptor fragment.

22. The method of claim 21 wherein the maneuver instruction comprises information relating to a freeway.

23. The method of claim 21 wherein the maneuver instruction further comprises a first string relating to an action for the maneuver instruction.

24. The method of claim 23 wherein the maneuver instruction further comprises a second string after the first string and before the plurality of voice fragments.

25. The method of claim 24 wherein the second string comprises the word "on".

26. A method for generating a maneuver instruction in a vehicle navigation system, the maneuver instruction comprising a plurality of voice fragments and corresponding to one of a plurality of maneuvers associated with a route generated by the vehicle navigation system, the method comprising selecting one of a plurality of audio files for each of the voice fragments thereby generating the maneuver instruction, the plurality of voice fragments comprising a first numeric voice fragment having first and second audio files corresponding thereto, the first audio file having a first intonation characterized by an upward emphasis and the second audio file having a second intonation characterized by a downward emphasis, the first audio file being selected when the first numeric voice fragment is attached to a second numeric voice fragment, the second audio file being selected when the first numeric voice fragment is unattached.

27. The method of claim 26 wherein the first one of the voice fragments precedes the second voice fragment.

28. The method of claim 26 wherein the maneuver instruction comprises information relating to a freeway.

29. The method of claim 28 wherein the first one of the voice fragments comprises information relating to a freeway.

30. The method of claim 26 wherein the maneuver instruction further comprises a first string relating to an action for the maneuver instruction.

31. A method for generating a maneuver instruction in a vehicle navigation system, the maneuver instruction comprising a plurality of voice fragments and corresponding to one of a plurality of maneuvers associated with a route generated by the vehicle navigation system, the method comprising selecting one of a plurality of audio files for each of the voice fragments thereby generating the maneuver instruction, the plurality of voice fragments comprising a first numeric voice fragment having first and second audio files corresponding thereto, the first audio file having a first intonation characterized by an upward emphasis and the second audio file having a second intonation characterized by a downward emphasis, the first audio file being selected when the first numeric voice fragment is attached to a second numeric voice fragment and followed by a descriptor voice fragment, and when the first numeric voice fragment is unattached and followed by a descriptor voice fragment, the second audio file being selected when the first numeric voice fragment is attached to the second numeric voice fragment and not followed by the descriptor voice fragment, and when the first numeric voice fragment is unattached and not followed by the descriptor voice fragment.

32. The method of claim 31 wherein the first one of the voice fragments precedes the second voice fragment.

33. The method of claim 31 wherein the maneuver instruction further comprises a first string relating to an action for the maneuver instruction.

34. A vehicle navigation system, comprising:
   a plurality of sensors for detecting a current vehicle position and a vehicle heading, and generating signals indicative thereof;
   a user interface for communicating navigation information to a user;
   a database medium having a map database and a plurality of voice fragment audio files stored therein;
   a processor coupled to the sensors, the user interface, and the database medium, the processor being operable to:
      generate a route which corresponds to a plurality of maneuvers;
      generate a maneuver instruction corresponding to one of the plurality of maneuvers, the maneuver instruction comprising a plurality of voice fragments;
      select one of a plurality of audio files for each of the voice fragments thereby generating the maneuver instruction, a first one of the voice fragments having at least two audio files corresponding thereto, the first audio file having a first intonation characterized by an upward emphasis and the second audio file having a second intonation characterized by a downward emphasis, the first audio file being selected when the plurality of voice fragments comprises a descriptor voice fragment following the first voice fragment, the second audio file being selected when the plurality of voice fragments does not include the descriptor fragment;
      present the maneuver instruction to the user; and
   an audio output communicator coupled to the processor for presenting an audio representation of the maneuver instruction to the user of the vehicle navigation system.

35. A computer program product for providing route guidance to a user of a vehicle navigation system, comprising:
   at least one computer-readable medium; and
   a computer program mechanism embedded in the at least one computer-readable medium for causing a computer to:
      generate a route which corresponds to a plurality of maneuvers;
      generate a maneuver instruction corresponding to one of the plurality of maneuvers, the maneuver instruction comprising a plurality of voice fragments;
      select one of a plurality of audio files for each of the voice fragments thereby generating the maneuver instruction, a first one of the voice fragments having at least two audio files corresponding thereto, the first audio file having a first intonation characterized by an upward emphasis and the second audio file having a second intonation characterized by a downward emphasis, the first audio file being selected when the plurality of voice fragments comprises a descriptor voice fragment following the first voice fragment, the second audio file being selected when the plurality of voice fragments does not include the descriptor fragment; and
   present an audio representation of each of the maneuver instructions prior to execution of a corresponding one of the maneuvers.

* * * * *